C. HORN.
FURNITURE-CASTERS.
No. 195,282. Patented Sept. 18, 1877.
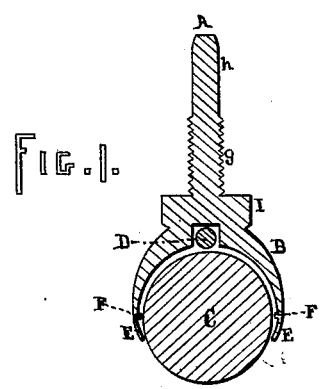
Fig. 1.
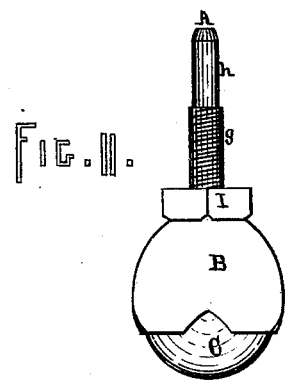
Fig. II.
Witnesses
Albert E. Zacherle
J. Elmer Hall
Inventor
Christian Horn
per George E. Buckley
atty.

UNITED STATES PATENT OFFICE.

CHRISTIAN HORN, OF PHILADELPHIA, PENNSYLVANIA.

IMPROVEMENT IN FURNITURE-CASTERS.

Specification forming part of Letters Patent No. 195,282, dated September 18, 1877; application filed July 18, 1877.

*To all whom it may concern:*

Be it known that I, CHRISTIAN HORN, of Philadelphia, Pennsylvania, have made certain new and useful Improvements in Ball-Casters; and I do hereby declare the following to be a full, clear, and exact description of the same, reference being had to the annexed drawings, making part hereof.

My invention consists of a caster, having a ball and malleable-metal socket, the inside of the socket-surface, which touches the ball, terminating in a shoulder about half-way down the sides of ball, and an extension of said socket continued down and bent in to hold the ball up, as hereinafter more fully described and claimed.

In the drawings, Figure I is a vertical section of my improved caster. Fig. II is a side view of the same.

A is the shank, for insertion into a bed-foot or other piece of furniture; B, the hollow bearing; C, the large ball; D, the smaller one in a cylindrical recess; E, the turned-in edge of the bearing, which may be rounded to prevent its cutting the rugs or carpet; F, the inner shoulder; g, the screw-threads of the shank; h, the plain part of the same; I, the nut.

The shank A and the hollow spherical bearing, preferably scalloped at its lower edge, are cast in one piece, of malleable or ductile metal, such as brass, malleable iron, &c. The screw-thread g may be turned or cast upon all or the lower part of shank A. The semi-spherical hollow bearing is capped above by a supplemental semi-spherical or cylindrical recess, as shown in Fig. 1. This hollow sphere and upper recess are each slightly larger laterally than the balls which they are to contain. The cast-iron, steel, or case-hardened iron balls C D are then inserted. D first is dropped into the small hollow, and large ball C is then set in. The rim is then bent over so as nearly to touch ball C below its middle, so that the balls will be retained in place. The balls are allowed to set rather loosely in the bearings, but not so much as to allow the smaller one to leave its station at the top of the larger one. The caster is then ready for use.

The recess to hold small ball D has a depth slightly less than the diameter of ball D, so that the latter will project below it, and make a point of rest for the caster to set upon ball C.

The shoulder F, or more properly the annular ring F, is to form a zone around the middle of ball C to receive its friction laterally, so that the ball C, in its revolutions, only comes into frictional contact with this ring F and the small ball D, and not with any part of the inner surface of the hemispherical socket or bearing B.

The lower lips or edges E are bent in sufficiently to prevent ball C from falling out, and not to bind it when the caster is resting upon the floor in position. The polygonal base I of the shank A is cast with the rest of the caster, in one piece with it, to serve the purpose of a nut or bolt head.

To insert my caster, I bore a small hole in the foot of the chair, bedstead, or other article of furniture, then drive in the shank A by blows upon the hard ball C until the screw-thread g can bite. I then, by means of a wrench applied to the base I, screw the shank home.

The boring of a hole can be dispensed with, if desired, and the smooth part of the shank can be boldly driven in; or all of said shank may be screw-threaded and inserted in a bored hole.

I am well aware that many ball-casters have been used before constructed in various forms; but most of them are either of complicated and costly construction, or the balls are so hard to revolve as not to be practically useful.

Having thus described my invention, what I claim as new, and desire to secure by Letters Patent, is—

A caster having a ball and malleable-metal socket, the inside of the socket-surface, which touches the ball, terminating in a shoulder about half-way down the sides of the ball, and an extension of said socket continued down and bent in to hold the ball up, substantially as and for the purpose described.

CHRISTIAN HORN.

Witnesses:
ALBERT E. ZACHERLE,
J. ELMER HALL.